United States Patent [19]

Hutchison

[11] 4,178,913

[45] Dec. 18, 1979

[54] SOLAR COLLECTOR SYSTEM

[75] Inventor: J. A. Hutchison, Dallas, Tex.

[73] Assignee: Solar Kinetics, Inc., Dallas, Tex.

[21] Appl. No.: 864,089

[22] Filed: Dec. 23, 1977

[51] Int. Cl.² .................................................. F24J 3/02
[52] U.S. Cl. .................................... 126/424; 350/293; 126/438
[58] Field of Search ............... 126/270, 271; 237/1 A; 60/641, 462, 478; 353/3; 250/203 R; 350/288, 299, 292, 293, 310

[56] References Cited

U.S. PATENT DOCUMENTS

| | | | |
|---|---|---|---|
| 2,712,772 | 7/1955 | Trombe | 126/270 |
| 3,847,136 | 11/1974 | Salvail | 126/271 |
| 4,063,543 | 12/1977 | Hedger | 126/270 |
| 4,064,865 | 12/1977 | Depew | 350/292 |
| 4,079,725 | 3/1978 | Chadick | 126/271 |

Primary Examiner—James C. Yeung
Attorney, Agent, or Firm—Hubbard, Thurman, Turner, Tucker & Glaser

[57] ABSTRACT

An improved solar collector system includes a moveable surface to receive solar radiation. The moveable collector surface is supported by at least one load bearing universal joint. The movement of the collector surface is accomplished by a hydraulic actuated tracking system to enable the collector surface to be oriented toward the sun to achieve maximum solar energy recovery. The hydraulic actuated tracking system includes at least two hydraulic cylinders and pistons whereby the primary piston and cylinder control the position of the secondary piston and cylinder which, in turn, control the orientation of the collector surface.

11 Claims, 6 Drawing Figures

SOLAR COLLECTOR SYSTEM

BACKGROUND OF THE INVENTION

This invention relates to an improved solar collector system. In another aspect, this invention relates to a solar collector system wherein the collector surface is moveable to enable it to be oriented toward the sun. In yet another aspect, this invention relates to an improved solar collector system wherein the moveable collector surface is supported by an improved structure. In still another aspect, this invention relates to an improved solar collector system wherein movement of the collector surface is controlled by an improved hydraulic tracking means. In yet another aspect, this invention relates to an improved solar collector system wherein the system can withstand prolonged exposure to varying wind loads and movement of the support structure without decreasing the efficiency of the system.

Recent economic and political developments have resulted in a drastic increase in the cost of conventional energy sources such as crude oil, natural gas and the like. Due to the increased prices of conventional energy sources and because of the very real and potential shortages of conventional energy sources such as crude oil, natural gas and the like, many alternative sources of energy are being investigated. One particularly promising alternative source of energy is the recovery and use of solar radiation or "solar energy". While it has long been known that solar energy is a vast, untapped source of energy, conventional energy sources such as crude oil, natural gas and the like, have been so cheap that solar energy recovery could not be justified from an economic standpoint. Now, because of the changing economic conditions affecting conventional energy and because of possible shortages of such conventional energy, solar energy represents a viable source of energy.

Many types of solar collector systems have been investigated. Such solar collector systems include tubes, mats and other large surface area solar collectors that contain some type of working fluid that is heated by merely placing such large solar collectors in the sun. Such solar collectors are effective in heating the working fluids only a few degrees above ambient temperature. Additionally, such large solar collectors are relatively expensive. Thus, the use of such large collectors is unattractive because a large capital investment must be made to recover only low grade energy.

Recently, a considerable amount of interest has been directed toward improved types of solar collectors to gather solar energy and concentrate the solar energy into a relatively small area to thereby achieve high temperatures. Such solar collectors usually involve some type of lens or prism reflective means or some type of reflective surface means that will concentrate solar radiation from a relatively large area onto a relatively small target or collector means. The use of highly reflective surfaces or mirror-type surfaces are very effective for gathering solar radiation striking a relatively large effective area and focusing or concentrating the radiation onto a relatively small target area or energy receiver. Such types of solar collectors include a collection of many individual flat mirrors that can be focused onto one small target or energy collector, as well as various types of curved and shaped reflective surfaces that will forcus the thus collected solar energy onto a relatively small surface or energy receiver.

One particularly preferred type of solar collector is a parabolic reflector which will gather solar radiation and reflect the radiation onto a small target or energy receiver which is located at the focal point of the parabola. Because of the relatively high cost of constructing a true parabolic surface, parabolic reflectors are not widely used for low cost energy recovery from the sun.

Recently, "trough-like" reflectors have been investigated as relatively low cost types of solar collectors. The trough-like reflectors have proven to be much less expensive to manufacture than true parabolic reflectors. Some of the most effective trough-like reflectors utilize a relatively large reflector surface that is formed by constructing an elongated trough-like means with the walls of the trough having a constant parabolic shape whereby the focal point of the parabolic trough lies along a relatively straight line above the trough. Thus, the concave trough-like solar collector can be equipped with a target or energy receiver that is disposed along the line formed by the focal point of the parabolic reflector. By using such a reflector means, solar radiation which strikes the concave surface of the solar collector will be reflected and concentrated onto the focal point of the parabola and can be captured by an energy receiver located at or near the focal point of the parabolic surface.

In order to maximize the amount of solar energy that can be captured using reflector type solar collectors, it has been found highly desirable to utilize a moveable solar collector. By using the moveable solar collector, as opposed to stationary collectors, the efficiency of the solar collector system can be greatly increased. Thus, the use of moveable solar collectors that can be effectively aimed at the sun will greatly increase the overall energy recovery efficiency of the system. In the case of parabolic shaped solar collectors, maximum energy recovery is obtained when the axis of the parabola is aimed directly toward the sun.

Conventional methods and apparatus for supporting and aiming solar collectors toward the sun are rather crude and simple. For example, support means for solar collectors usually include axles or support rods on which the collector means is supported with the axles being journaled into bearing means or bushings whereby the supported reflector can be rotated to presumably point the reflector surface directly toward the sun. This type of apparatus for supporting the solar collector is wrought with many problems. Specifically, it is extremely difficult to install such a type of system in such a manner that the bearings and axle means are in precise alignment. This is extremely critical, especially when the solar collector is quite large and the bearing means must be positioned to receive and support the axle when the bearing means are a considerable distance apart. It is, of course, not uncommon to have solar collectors that are up to at least twenty feet in length with the collector surface being supported only at the outer ends by journaling the axle means into bearing means that are carried by pylons that are at least twenty feet apart. Even if the system can be installed with the bearing means being precisely aligned to receive the axle means, problems still exist due to an uneven shifting or settling of the pylon means. It is, of course, well known that many solar collectors are installed on roof tops. Due to the weight of the solar collectors, as well as varying loads from wind, rain, ice, snow and the like, on the roof structure, will cause support pylons for solar collectors to move and shift to a considerable degree.

Such movement and shifting of the pylons will, of course, cause a misalignment of the bearing means. Still another problem connected with conventional methods and apparatus for supporting solar collectors is due to the fact that varying wind loads on the solar collector structure, itself, will often cause bending and twisting forces to be exerted on the solar collector and its supporting axles to cause misalignment of the axles with the bearing means.

In all cases where there is even the slightest amount of misalignment between the bearing means and the axles that carry solar collectors, rotation of the solar collectors will become extremely difficult, if not impossible. Thus, even if the system is designed to withstand misalignment of the axles and bearing means, a considerable amount of force and energy will be necessary to cause any desired rotation of the solar collector.

Conventional means for actually causing the rotation of solar collectors to allow them to be aimed at the sun to maximize energy collection is to utilize a mechanical drive system. The mechanical drive system will normally be a system of gears that are driven by some type of motor means. The mechanical gears can include a conventional gear train with interlocking cog gears or a worm gear arrangement can be utilized. Thus, by affixing at least one of the gears to either the axle of the solar collector or to the solar collector structure, itself, and having such gear mesh with other gears that are coupled to suitable crank means, motor means or the like, the solar collector can be selectively aimed at different points in the sky by activating the crank, motor or the like. Unfortunately, such mechanical systems are also subject to many problems. Such mechanical devices for moving a solar collector simply do not stand up well over long periods of uses because the gear mechanism invariably wears and develops "back lash". The wearing of the gear surfaces and the development of back lash will cause an erratic movement of the solar collector as the collector is being pointed toward the sun. This is especially noticeable when the solar collector is exposed to buffeting wind loads. Another problem connected with the use of mechanical drive means occurs in the amount of power that is necessary to drive such mechanical devices. In order to achieve the desired movement of the solar collector, it is often necessary to utilize heavy and expensive variable speed motors. While attempts may have been made to utilize constant speed motors and to periodically activate the motors in response to a command signal, it has been found that the power consumption for the intermittent activation of such motors is quite high. There are several instances where the amount of power required to move the solar collector to track the sun as it traverses the sky often approaches the amount of energy that can be recovered by using the solar collector.

It is, thus, very apparent that there is a need for an improved support system and system for moving solar collectors. It is also evident that there is a tremendous need for improved solar collector systems that can be installed in locations where the support structure may move and shift without decreasing the efficiency of the system. It is also evident there there is a need for an improved solar collector system whereby the solar collector can be moved in response to a command with very little power usage and without the problems connected with conventional apparatus for moving solar collectors.

SUMMARY OF THE INVENTION

Accordingly, it is an object of this invention to provide an improved solar collector system wherein the collector surface is moveable to enable it to be oriented toward the sun. Another object of this invention is to provide an improved solar collector system that can be installed on a surface that is subject to uneven movement and shifting. It is yet another object of this invention to provide an improved solar collector system wherein the solar collector can be moved to any desired orientation without problems normally associated with conventional tracking gear.

Other aspects, objects and advantages of this invention will be apparent to those skilled in the art from the following disclosure and appended claims.

In the instant invention, a solar collector system includes a moveable solar collector surface that is mounted on rotation axles. The rotation axles are journaled into bearing means which are supported by a suitable support structure. In a preferred embodiment, at least one load bearing universal joint is disposed in the rotation axle system to compensate for angular misalignment of the bearing means. The improved solar collector system of this invention also includes a hydraulic tracking system wherein the solar collector surface can be rotated and directed to any desired orientation by means of a unique hydraulic system. In the instant invention, the hydraulic system can be adapted to provide for tracking the sun from horizon to horizon to obtain maximum efficiency in collecting solar radiation. The hydraulic tracking system includes a source of pressurized hydraulic fluid and at least two hydraulic piston and cylinder means which are selectively extended and retracted by selectively pumping the hydraulic fluid into and out of the cylinders. A primary hydraulic cylinder is affixed to a suitable support and is utilized to rotate a rotation collar. The rotation collar supports the secondary hydraulic cylinder means which is operably connected to the solar collector surface whereby the selective extension and contraction of either or both the primary and secondary piston means will cause selective rotation of the solar collector surface. Suitable controls are operably connected to the hydraulic system to cause the hydraulic fluid to flow into and out of the primary and secondary cylinders to control movement of the solar collector surface.

DESCRIPTION OF PREFERRED EMBODIMENTS

Figure 1:
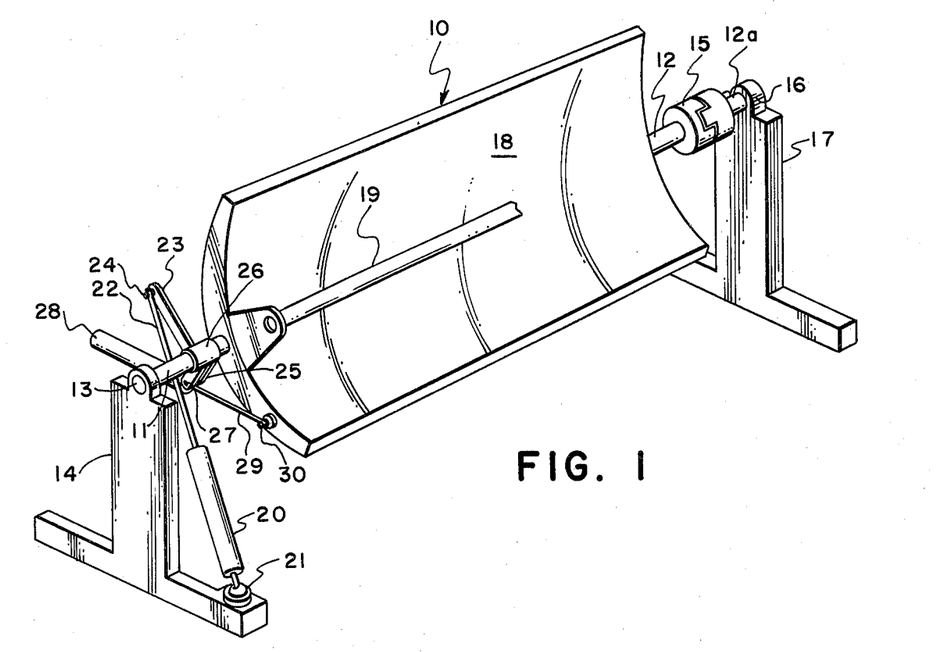
FIG. 1 is a perspective view of a solar collector system in accordance with the instant invention with the hydraulic hoses and a portion of the collector tube being removed.

The preferred embodiments of this invention can best be described by referring to the drawings. FIG. 1 illustrates a solar collector system in accordance with the instant invention. Trough-like solar collector panel 10 is supported by axles 11 and 12. Axles 11 and 12 can be any suitable rigid structure that will support the weight of solar collector panel 10. Any known method for constructing solar collector panel 10 can be utilized to produce the desired collector surface. Rotation axle 11 is journaled into suitable bearing means 13 which is supported by and carried by support pylon 14.

Rotation axle 12 is rigidly affixed to one-half of universal joint 15. The other half of universal joint 15 is affixed to rotation axle 12a. Rotation axle 12a is journaled into bearing means 16 which is carried and supported by support pylon 17.

As illustrated in FIG. 1, solar collector panel 10 is a trough-like solar collector having a concave reflectorized surface 18. By properly shaping reflectorized surface 18, such as a concave trough-like shape in the form of a parabola, solar radiation striking the reflectorized surface will be reflected back toward the focal point of the trough-like parabolic surface. Collector tube 19 is positioned along the line formed by the focal point of the parabolic trough. Thus, essentially all of the solar radiation striking highly reflectorized surface 18 will be reflected back to a focal point which is occupied by collector tube 19. Suitable working fluids can be pumped through collector tube 19 to gather the solar energy in the form of sensible heat. Suitable means for pumping the working fluid through collector tube 19 are well known in the art and are not illustrated in FIG. 1. It should be noted that only a portion of collector tube 19 is illustrated in FIG. 1, with the right side portion of the collector tube being removed to illustrate some of the preferred embodiments of this invention.

For maximum efficiency and recovery of solar energy with the solar collector system shown in FIG. 1, it is desired to point the reflectorized surface 18 directly toward the sun. In other words, it is desired to have the axis of the parabolic surface pointed directly toward the sun at all times. Since the sun, of course, traverses the sky during the day, in order to keep the parabolic reflectorized surface pointed directly toward the sun, it will be necessary that the reflectorized surface be rotated about the axis of rotation axles 11 and 12. In order to accomplish this, rotation axles 11 and 12a must be rotatably journaled into bearing or bushing means 13 and 16.

It is, of course, well known that solar collector panels gather useful energy in direct proportion to the surface area of such panels. Therefore, commercial solar collector panels, such as the one illustrated in FIG. 1, will be quite large. Often, the length of the collector panel alone may be as much as twenty feet in length. Since the collector panels are quite large, it will be expected that support pylons 14 and 17 will be positioned a considerable distance apart. Since it is highly desirable to have a solar collector panel that can be freely and easily rotated with minimum power consumption for the rotation, bearing means 13 and 16 must be very closely aligned to receive rotation axles 11 and 12a. Thus, with conventional types of solar panel systems, it is extremely difficult to properly align these widely separated bearing means and, thereafter, have the solar collector panels journaled into the bearing means without binding or causing undue friction between the axles and the bearing means. Even if initial installation is successful, the support pylons and the bearing means carried by the support pylons very often shift and settle to thereby cause a misalignment that results in a binding effect on the axles of the solar collector panel. This is especially true when the relatively heavy solar collector systems are installed on roof tops of buildings and the like. The building roof tops very often settle and shift under varying weights of the solar collector panels, as well as under varying weights of snow, ice and standing water. Additionally, normal temperature contractions will cause uneven shifting of a roof top structure, thereby causing a misalignment of the bearing means with the axles of the solar collector panel. Wind factors also play a very important role in misalignment of the bearing means with the rotation axles in conventional installations. Thus, as the solar collector panel is buffeted by variable wind loads, a considerable amount of misalignment of the bearing means with the rotation axles will occur, causing undue wear and strain on the support panels, bearing means and the axles. In some instances, shifting and settling of the support pylons, as well as wind buffeting, will cause such severe misalignment that it is virtually impossible to rotate the solar collector panel in the desired manner. This will, of course, overload the mechanical tracking gear and will often cause failures of the tracking gears by virtue of stripped gear teeth, burned out motors and the like.

Figure 2:
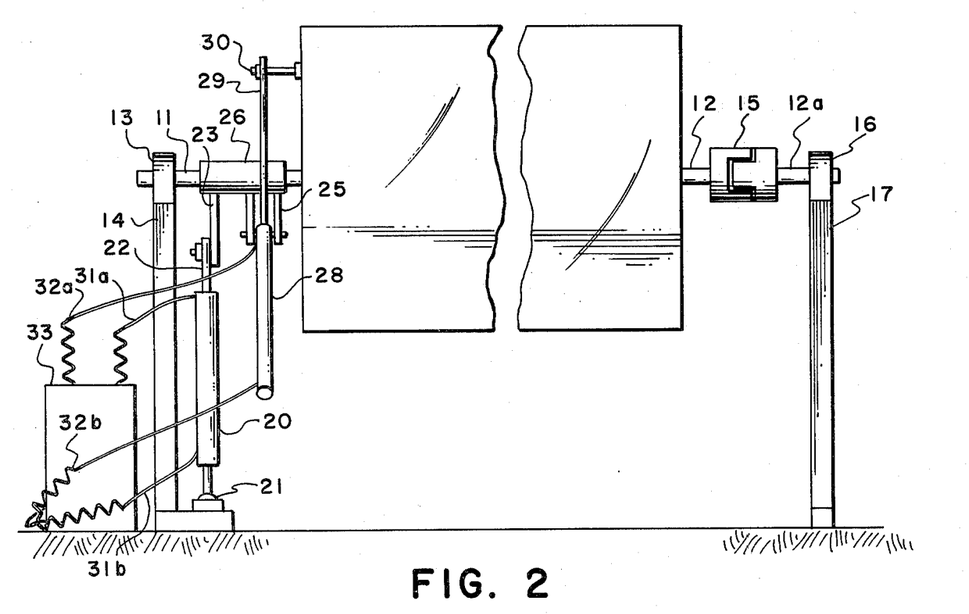
FIG. 2 is an elevational view of the solar collector system of this invention showing the back side of the solar collector surface with a portion of the middle of the solar collector surface being removed.

In the instant invention, however, all of the previous problems connected with misalignment of bearing means and rotation axles are alleviated by the incorporation of at least one load bearing universal joint in the rotation axle of the solar collector panel. As illustrated in FIG. 1 and FIG. 2, universal joint 15 is incorporated into rotation axle 12 whereby the free end of rotation axle 12 is rigidly affixed to one-half of universal joint 15 and the other half of universal joint 15 is affixed to rotation axle 12a. Rotation axle 12a is then journaled into bearing means 16 which is affixed to and carried by the upper portion of support pylon 17. With the incorporation of load bearing joint 15 into the rotation axle, any reasonable shifting and misalignment of bearing means 16 with bearing means 13 will be compensated for. Thus, universal joint 15 serves as an angular misalignment compensator to allow solar collector panel 10 to be freely rotated even when bearing means 13 and 16 are shifted and displaced from their normally aligned orientation. It will be appreciated that more than one universal joint can be placed in the rotation axles of the solar collector panel. If desired, an additional load bearing universal joint can also be placed in rotation axle 11 to provide additional angular misalignment compensation if there is severe misalignment of the bearing means.

By using the load bearing U-joints to compensate for angular misalignment of the bearing means with the axle means, the instant invention can be effectively utilized to mount support pylons 14 and 17 on surfaces that would normally be unacceptable for mounting solar collector panels. For example, support pylons 14 and 17 can now be mounted on roof top structures that will have a considerable amount of movement and shifting by virtue of temperature contractions, shifting and settling caused by weight and wind loads and the like. In some instances, the support pylons can also be mounted on ground structures that are known to move and shift in an uncontrolled fashion.

The instant invention utilizes a unique hydraulic system for properly positioning and orienting the solar collector panel to any desired orientation. By utilizing the instant hydraulic system for orienting the solar panel, many of the disadvantages of the prior art mechanical tracking equipment are alleviated. For example, it is well known that one of the most difficult problems associated with mechanical tracking equipment for use on solar collector panels is in the problem of "back lash". Back lash is caused by undue wear to the mechanical elements of the tracking system caused by either continued use, the effects of wind buffeting and by the effects of strain placed on the mechanical tracking gear when there is a misalignment of support bearing means with the rotating axles. While mechanical tracking gear such as various gear trains, including meshing cog gears, worm gears and the like, have been widely used in solar panel construction and operation, such equipment has many shortcomings. In addition to the above-mentioned problem of "back lash" due to excessive wear of the mechanical components, such a system is extremely difficult to maintain. Since the solar collector panels are usually erected and operated out of doors, it is difficult to prevent corrosion from taking place on the surfaces of the mechanical equipment. Therefore, expensive materials of construction have been widely utilized to make the components of the mechanical tracking gear from. Mechanical tracking gear also is plagued with the problem that it will usually track at only one speed. In order to keep the cost of the mechanical tracking gear at an attractive level, small motors are normally utilized. Such small motors are connected to an elaborate gear train and the result is the tracking or movement of the solar collector system is at a very slow rate. In an effort to overcome this obvious shortcoming, various suggestions have been made to utilize variable speed motors that can be rotated at varying speeds to either increase or decrease the tracking movement of the solar collector panel. By using variable speed motors, the cost of the conventional tracking systems is increased dramatically, as well as the cost of operation of such systems. It will, of course, be appreciated that there are many times when it is highly desirable to have the solar collector panel rotate at a relatively fast speed. For example, the reflectorized surfaces of most solar collectors are highly susceptible to damage from extreme winds, hail, sleet, and the like. Therefore, there are instances where it is necessary to have a relatively rapid movement of the solar collector panels to a position where the delicate reflectorized surfaces of the panel can be turned away from wind blown sleet, hail, sand and the like. Without resorting to a very expensive variable speed motor system on conventional equipment, high speed movement of the solar collector system is not possible.

In the instant invention, orientation of the solar collector panel is accomplished by a unique hydraulic system that incorporates at least two hydraulic cylinders with related pistons and piston rods. A primary cylinder, piston and piston rod is utilized to position a secondary cylinder, piston and piston rod. The primary cylinder, piston and piston rod is operably connected to the support structure and a rotation collar means. The secondary piston, cylinder and piston rod is operably supported by the rotation collar. The secondary cylinder or terminal end of the secondary piston rod is affixed to a portion of the solar collector panel whereby movement of hydraulic fluid into or out of the secondary cylinder will cause rotation of the solar collector panel about its rotation axis.

As shown in FIGS. 1 through 5, the lower end of primary cylinder 20 is pivotally affixed to a portion of support pylon 14 at pivot point 21. The upper free end of primary piston rod 22 is affixed to primary rotating arm 23 at pivot point 24. Primary rotating arm 23 is rigidly affixed to secondary rotating arm 25. As can be more clearly seen in FIGS. 3 through 5, primary rotating arm 23 and secondary rotating arm 25 are rigidly affixed to rotation collar 26. Rotation collar 26 has a round bore with rotating axle 11 passing through the bore in such a manner that rotating collar 26 is free to rotate around rotation axle 11. Affixed to the terminal end of secondary rotating arm 25 at pivot point 27 is secondary cylinder 28. Secondary piston rod 29 is affixed to solar collector panel 10 at pivot point 30.

Figures 3, 4, 5:
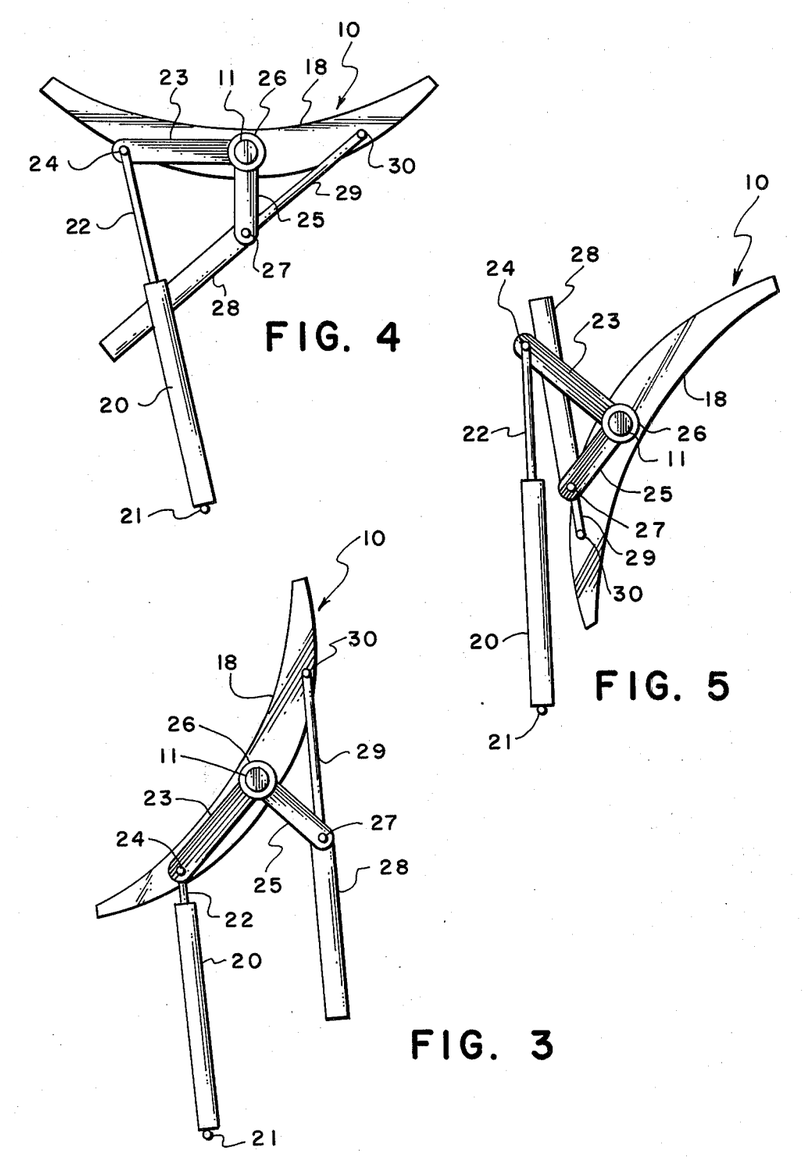
FIG. 3 is a side elevational view of a portion of the solar collector system of this invention showing the orientation of the primary and secondary piston and cylinder means as they would be oriented when the collector surface is in the position shown in FIG. 2 as viewed from the left of FIG. 2.
FIG. 4 is a side elevational view of a portion of the solar collector system of this invention with the solar collector surface pointing directly skyward.
FIG. 5 is a side elevational view of a portion of the solar collector system of this invention showing the relative orientation of the primary and secondary cylinder and piston means with the surface of the solar collector being in a stow position.

FIG. 3, FIG. 4 and FIG. 5 are end views of a portion of the solar collector system illlustrated in FIG. 1. In FIGS. 3, 4, and 5, support pylon 14 has been removed to more clearly illustrate the function and operation of the primary and secondary piston and cylinder means as they are utilized to position and move solar collector panel 10 from one tracking extreme to the other. As shown in FIGS. 3, 4 and 5, the apparatus of this invention is quite useful for aligning the axis of the solar collector panel in a north-south line and then tracking the sun from one horizon to the other as the sun traverses an east to west path. Many prior art systems are not capable of tracking the sun from one horizon to the other when the axis of the trough-like solar collector is aligned in a north-south direction. Therefore, such prior art systems are necessarily aligned with the axis of the solar collector on an east-west line with movement of the solar collector panel being limited to a relatively small degree to compensate for the movement of the sun in a north-south direction as the seasons change and as the sun traverses the sky. Such east-west alignment of solar collector panels do not have the same seasonal high energy recovery efficiency as the apparatus of this invention. With the instant invention the solar collectors can be oriented in either an east-west or north-south alignment with superior tracking capabilities. An additional advantage of the instant apparatus is the capability of placing the solar collector panel in a "stow" position, as is shown in FIG. 5. There are many occasions when it is highly desirable to place the highly polished reflectorized surface 18 in a position where it will be protected from the ravages of hail, sleet, snow, blowing dust and the like. Therefore, as illustrated in FIG. 5, the instant apparatus has the capability of rotating the solar collector panel to a point where the highly reflectorized surface of the solar collector panel no longer points toward the sky. As will be described hereinafter, the instant invention provides for high speed rotation of the solar collector panel from one tracking position to another. This high speed rotation is especially useful for moving the solar collector panel surfaces from a tracking mode to a stow mode in times of sudden storm and the like.

By examining FIG. 3, it will be noted that reflectorized surface 18 may be directed toward one horizon by utilizing primary piston and cylinder means 20 with the primary piston means being in a near fully collapsed position to withdraw primary piston rod 22 into the primary cylinder sleeve. As the primary piston rod 22 moves downwardly into primary cylinder means 20, the operable connection of primary piston rod 22 to primary rotating arm 23 will cause the terminal end of primary rotating arm 23 to move downwardly. As primary rotating arm 23 moves downwardly, such movement will cause rotation collar 26 to rotate about rotation axle 11 to thereby cause the terminal end of secondary rotating arm 25 to move upwardly. By virtue of the operable connection of secondary cylinder and piston means 28 to the end of secondary rotating arm 25 at pivot point 27, the entire secondary piston and cylinder means 28 will move upwardly. By then extending secondary piston rod 29 outwardly from secondary cylinder means 28, solar collector panel 10 will rotate about rotation axle 11 to the position shown in FIG. 4 by virtue of the pivotal connection of the terminal end of secondary piston rod 29 to solar collector panel 10 at pivot point 30. With the solar collector panel in the position illustrated in FIG. 3, movement of the solar collector panel is thereafter accomplished by either moving secondary piston rod 29 upwardly or downwardly by the selective injection and withdrawal of hydraulic fluid into or out of secondary cylinder 28. Additionally, movement of solar collector panel 10 can be accomplished by the selective injection and withdrawal of hydraulic fluid into and out of primary cylinder means 20 while maintaining the predetermined extension of secondary piston rod 29. As mentioned above, the lower end of primary cylinder means 20 is affixed to a suitable support or anchor structure, such as support pylon 14 at pivot point 21.

FIG. 4 illustrates the relative positioning of the primary and secondary piston and cylinder means as solar collector panel 10 is oriented with reflectorized surface 18 pointing directly skyward. As will be illustrated by FIG. 4, primary piston rod 22 is extended approximately three-fourths of its length from primary cylinder means 20. With such extension, primary rotating arm 23 will be rotated upwardly from the position illustrated in FIG. 3. With the rotation of primary rotating arm 23 upwardly, secondary rotating arm 25 is rotated downwardly, thereby moving secondary cylinder and piston means 28 downwardly. With secondary piston rod 29 extended approximately three-fourths of its length from secondary cylinder means 28, the operable connection of the terminal end of secondary piston rod 29 to solar collector panel 10 at pivot point 30 will cause reflectorized surface 18 to be rotated skywardly. The relative positioning of reflectorized surface 18 can be very readily accomplished by the selective injection and withdrawal of hydraulic fluid into and out of either or both of primary cylinder means 20 and secondary cylinder means 28.

FIG. 5 illustrates the relative positioning of the piston and cylinder means when the solar collector panel is placed in a stow position. As shown in FIG. 5, primary piston rod 22 is in a near fully extended positon to thereby cause primary rotating arm 23 to rotate upwardly about rotation axle 11. With such rotation, secondary rotating arm 25 is rotated downwardly to thereby cause secondary piston and cylinder means 28 to be rotated upwardly as illustrated. Then, by moving secondary piston rod 29 almost completely inwardly into secondary cylinder 28, reflectorized surface 18 is caused to rotate downwardly by virtue of the operable connection of the terminal end of secondary piston rod 29 to the solar collector panel at pivot point 30.

FIG. 2 illustrates one preferred configuration of rotation collar 26 with primary rotating arm 23 and secondary rotating arm 25 being offset to allow the unhampered movement of the above-described primary and secondary cylinder and piston means. It will be appreciated that other configurations can also be utilized whereby the primary cylinder means and piston means are utilized to position the secondary piston and cylinder means to allow full rotation of the solar collector panel from one horizon to the opposite horizon.

It will also be appreciated that the operable connections of primary cylinder 20 and primary piston rod 22 can be reversed from the connections illustrated, whereby the terminal closed end of cylinder 20 can be affixed to rotation collar 26 at pivot point 24 and the terminal end of piston rod 22 can be affixed to the support means at pivot point 21. Likewise, secondary cylinder 28 can be affixed to solar collector surface 10 at pivot point 30 and the terminal end of secondary piston rod 29 can be connected to rotation collar 26 at pivot point 27. In the drawings, rotation collar 26 has been shown as surrounding axle means 11. While this is a preferred configuration, collar 26 can be supported in other ways such as by providing a separate rotation axle or pin which can be carried by support structure 14.

As shown in FIG. 2, primary hydraulic fluid lines 31a and 31b are in open communication with the portion of primary cylinder means 30 to allow the selective addition and withdrawal of hydraulic fluid to the cylinder means above and below the primary piston means disposed within the cylinder sleeve. Primary hydraulic fluid lines 31a and 31b are also in open communication with a suitable source of pressurized hydraulic fluid and the necessary control equipment to allow the selective addition and withdrawal of fluid from the primary cylinder means to cause the desired movement of the primary piston within the sleeve of the primary cylinder means. Likewise, secondary hydraulic fluid lines 32a and 32b are in communication with secondary cylinder means 28 and a source of pressurized hydraulic fluid with necessary controls to allow the desired addition and withdrawal of hydraulic fluid from secondary cylinder means 28, both above and below the secondary piston disposed within such cylinder sleeve. Housing 33 can be utilized to contain the source of hydraulic fluid and hydraulic fluid control means to allow the hydraulic fluid to be selectively injected and withindrawn from the primary and secondary cylinder means. It will be appreciated that both primary and secondary hydraulic fluid lines 31a, 31b, 32a and 32b are preferably flexible tubing of sufficient length to allow the cylinder means to move as illustrated in FIGS. 3, 4 and 5.

Figure 6:
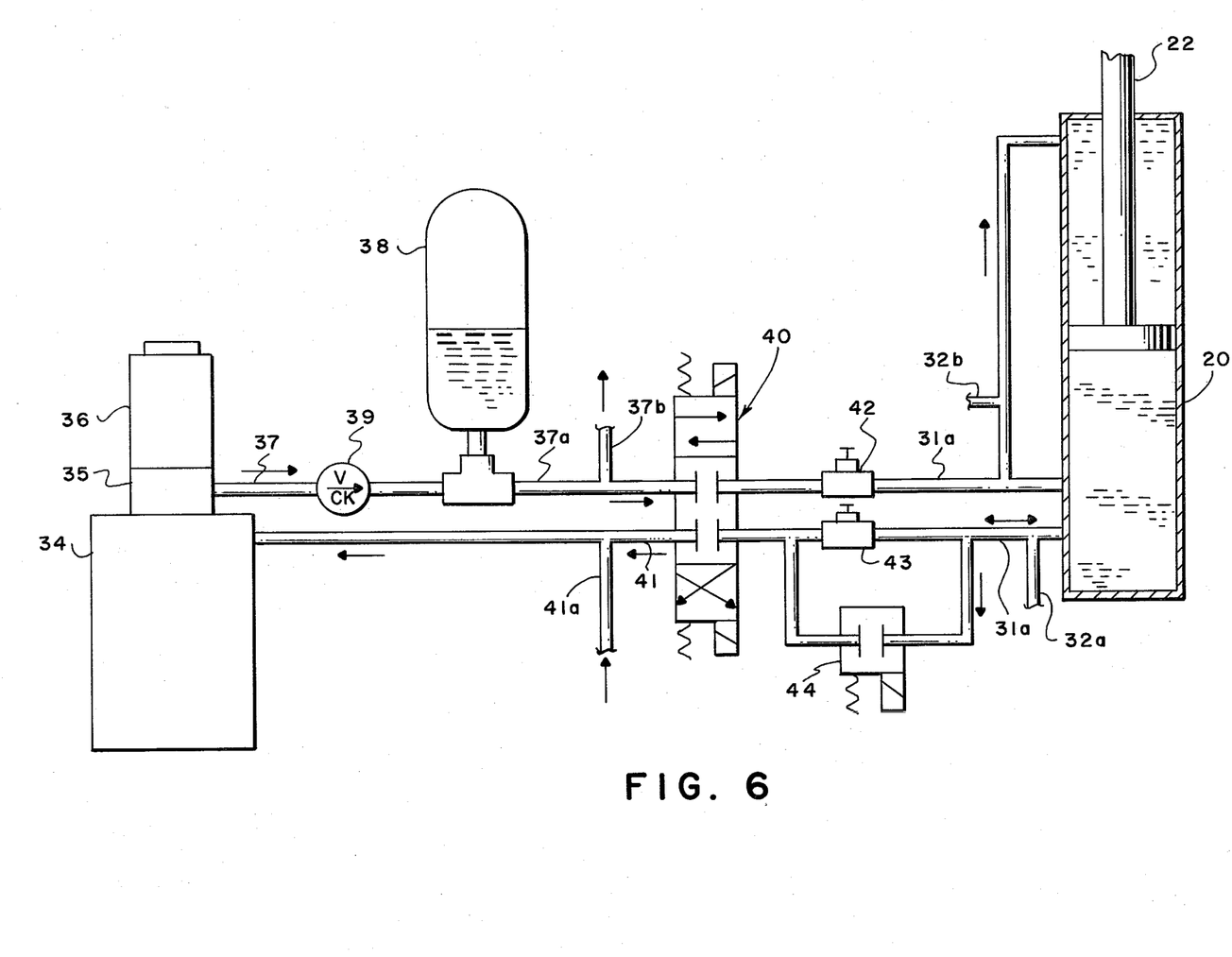
FIG. 6 is a schematic representation of the hydraulic system of this invention.

FIG. 6 is a schematic drawing of one preferred hydraulic system that can be utilized in the instant invention to selectively inject and withdraw hydraulic fluids from the hydraulic tracking system of this invention. As shown in FIG. 6, hydraulic fluid reservoir 34 is utilized to contain hydraulic fluid that is later supplied to the hydraulic system under pressure. Hydraulic fluid from hydraulic fluid reservoir 34 is pumped by means of pump 35 which is powered by a small, but efficient, motor means 36 through hydraulic fluid supply conduit 37 into hydraulic fluid accumulator 38. Hydraulic fluid accumulator 38 is utilized to supply the necessary pressurized fluid to the primary and secondary cylinder means. Pressure in hydraulic fluid accumulator 38 is maintained by any suitable means, such as by use of a compressable fluid, such as an inert gas being maintained within the accumulator along with the hydraulic fluid. Thus, when a liquid hydraulic fluid is pumped into hydraulic fluid accumulator 38, the gaseous overhead will be compressed to thereby maintain the hydraulic fluid under pressure. In the instant system, pressures of up to several thousand pounds per square inch are often utilized. It will be appreciated that the instant system utilizes very small amounts of hydraulic fluid. Therefore, for a system that is utilized to operate one or more standard solar collector panels, the volume of the hydraulic fluid accumulator can be as little as one or two gallons. In such instances, the pressure of the hydraulic fluid will be maintained at several hundred pounds per square inch. In the instant apparatus, it is not necesssary for pump means 35 to run continuously. In fact, one of the highly desirable features of this invention is the design of a system wherein pump means 35 can be operated by a relatively small but efficient motor means 36 to pump hydraulic fluid from reservoir 34 into accumulator 38 intermittently. It is not necessary and, in fact, is not desired, to have motor means 36 to run continuously. In many instances, sufficient hydraulic fluid can be pumped in a very energy efficient manner into accumulator 38 by having the motor means run only for a few minutes at different times during the tracking day. Thus, by designing the instant system to have the most energy efficient motor means to pump the hydraulic fluid into accumulator 38, a considerable energy savings can be accomplished when comparing the instant tracking apparatus with conventional mechanical means for rotating solar collector systems. With such mechanical systems, it is required to have almost a constant turn-on and turn-off of the tracking system motor. Because the motor must be designed to run under a full load to cause the rotation of the solar panel, a considerable amount of energy is wasted just in the start-up of the motor which occurs from hundreds to thousands of times a day.

The motor means utilized in the instant invention is controlled by a suitable pressure switch (not shown) which can be disposed in hydraulic accumulator 38. Thus, when the pressure within the accumulator falls to a certain predetermined set point, the motor means can be activated and it will run until the pressure within accumulator 38 rises to a predetermined desired level, at which time motor means 36 will be stopped.

It has been found desirable to incorporate check valve 39 in hydraulic supply conduit 37 to prevent the pressurized hydraulic fluid from exerting a back pressure on pump means 35 when it is not running. Pressurized hydraulic fluid from accumulator 38 is selectively injected into the hydraulic cylinders through either hydraulic fluid lines 31a or 31b. The control of fluid flowing through these hydraulic fluid lines is controlled by any suitable means which will selectively control the hydraulic fluid flow in response to a signal which is generated by any known means. Tracking sensors for tracking the sun as it traverses the sky are well known in the art. For example, it is well known to utilize a "shadow bar" tracking sensor that tracks the sun by means of a photoelectric cell and a shadow bar to generate signals that will actuate the instant hydraulic tracking system. Additionally, tracking may be accomplished by other means such as by computer generated signals, mechanical timers, manual tracking means and the like. The exact type of sensor utilized to give signals to the instant hydraulic system does not form a part of this invention. Any known means for generating such signals can be utilized with the instant invention.

One preferred control apparatus that can be utilized in the instant invention is to utilize a three-position, four-way solenoid control valve. Thus, pressurized hydraulic fluid from accumulator 38 can be supplied to a three-position, four-way solenoid valve 40 through hydraulic supply conduit 37a. The three-position, four-way solenoid control valve is a well known valve means which allows incoming fluid to be directed to either of two other conduits which are in open communication with the valve means. The center position of the three-position, four-way solenoid valve is normally in an off position whereby fluid flow is completely interrupted in the hydraulic conduits. When the valve is in the "off" position, the apparatus is in a hydraulic lock mode and the solar collector panel is locked into position. Thus, valve 40 is utilized to direct the pressurized hydraulic fluid from supply conduit 37a into either hydraulic fluid lines 31a or 31b or to totally interrupt flow of the fluid through the conduits. The exact selection of which of hydraulic fluid lines 31a or 31b which will receive the pressurized hydraulic fluid is controlled by the proper positioning of the solenoid valve, which will be controlled by the known tracking sensor, mentioned above. The four-way solenoid valve also provides for the hydraulic fluid which is withdrawn from the cylinder means through either hydraulic supply conduits 31a or 31b to be directed back through the valve to exit into hydraulic fluid return conduit 41 which will then return the fluid to reservoir 34. Thus, the three-position solenoid valve is utilized to direct the pressurized hydraulic fluid into either hydraulic fluid lines 31a or 31b with the fluid being withdrawn from the cylinder being withdrawn through the other of these supply conduits and directed back through return conduit 41.

In the instant invention, the rate of movement of the piston means within the above-described cylinder means is controlled by the flow of the pressurized hydraulic fluid into the cylinder means. Therefore, directional flow control valve 42 can be disposed in hydraulic fluid line 31a to control the rate of flow of the pressurized hydraulic fluid into the top portion of the cylinder means. Likewise, flow control valve 43 can be disposed in hydraulic fluid line 31b to control the flow rate of pressurized hydraulic fluid into the lower portion of hydraulic cylinder 20. Preferably, flow control valves 42 and 43 control the rate of flow in only one direction with free flow of the fluid in the other direction. By properly adjusting the flow rates which are controlled by flow control valves 42 and 43, the tracking rate of the system can be very precisely controlled whereby actuation of the solenoid valve 40 for a predetermined period of time will cause movement of the solar collector panel to the desired degree. Normally, tracking rates will be quite slow with the flow rate of the hydraulic fluid through hydraulic fluid conduits 31a and 31b being very small.

There will be instances wherein it is desired to have a high speed movement or tracking of the solar collector panel, such as when it is desired to place the reflectorized surface in a stow position. Therefore, bypass valve 44 can be installed by bypass either or both of flow control valves 42 and 43. The purpose of bypass valve 44 is to bypass the flow restriction imposed by the bypass flow control valve. Since the flow control valve does limit fluid flow in one direction, it is highly desirable to have the capability of high speed injection of hydraulic fluid into the cylinder to allow high speed rotation of the solar panel. Bypass valve 44 can be any suitable means such as a solenoid actuated bypass valve, a manual bypass valve and the like. Thus, when bypass valve 44 is opened, flow control valve 43 will be bypassed and the hydraulic fluid can be injected into the lower portion of cylinder 20 under high speeds. Since flow control valve 42 is normally a flow control valve that controls injection of high pressure fluid into the cylinder and allows free flow of the fluid in the other direction, hydraulic fluid can be rapidly withdrawn from the upper portion of cylinder 20 to thereby allow the piston disposed within the cylinder to move rapidly upward.

The simplified schematic drawing of the hydraulic control system in FIG. 6 has been presented to show the control of hydraulic fluid flow into only one of the hydraulic cylinders. The same type of apparatus can also be utilized to control the hydraulic fluid flow into the other hydraulic cylinder that forms a part of this invention. In some instances, it may be desirable to use the system illustrated in FIG. 6 to control both the primary and secondary hydraulic cylinders. In such instances, high pressure fluid may be directed through supply conduit 37b to a second three-position, four-way solenoid valve control which will control fluid flow into a second cylinder with the return fluid being returned through return conduit 41a. In other instances, only one four-way solenoid valve may be utilized with the cylinders being connected in parallel with hydraulic fluid lines 32a and 32b being in open communication with lines 31a and 31b as illustrated in FIG. 6. When such cylinders are operated in parallel, some means, such as a solenoid valve between the two parallel cylinders, should be installed to prevent fluid from being transferred from one cylinder to the other to set up some undesirable oscillation of the solar panel as the fluid transfers from one cylinder to the other.

It will be appreciated that the above-described system allows for an infinite number of position adjustments to be made in the orientation of the reflectorized surfaces of a solar collector panel. It will also be appreciated that the hydraulic system for rotating and positioning the solar collector panel is not subject to undesirable "back lash" as normally associated with prior art systems. The hydraulic system, of course, provides additional cushioning and shock absorbing properties that are highly desirable when the panel is subjected to severe buffering by varying wind loads.

It is to be understood that various changes and modifications may be made in the foregoing description without departing from the spirit and scope of this invention.

The embodiments of the invention in which an exclusive property or privilege is claimed are defined as follows:

1. A solar collector system comprising:
   (a) a moveable solar collector surface;
   (b) rotation axle means supporting said solar collector surface;
   (c) support means for supporting said rotation axis means whereby said rotation axle means can be rotated about the axis of said rotation axle means;
   (d) a primary piston and cylinder means operably connected to said support means;
   (e) a rotation collar means, rotatably supported by said support means;
   (f) means for operably connecting said rotation collar means to said primary piston and cylinder means whereby movement of said primary piston within said primary cylinder causes rotation of said rotation collar;
   (g) a secondary piston and cylinder means operably supported by said rotation collar;
   (h) means for operably connecting said secondary piston and cylinder means to said solar collector surface whereby movement of said secondary piston within said secondary cylinder causes movement of said solar collector surface;
   (i) means for selectively adding and removing hydraulic fluid to and from said primary cylinder to cause said primary piston to move within said primary cylinder; and
   (j) means for selectively adding and removing hydraulic fluid to and from said secondary cylinder to cause said secondary piston to move within said secondary cylinder.

2. The system of claim 1 wherein said primary cylinder is affixed to said support means with one end of a primary piston rod affixed to said primary piston and the other end of said primary piston rod is affixed to said rotation collar means.

3. The system of claim 1 wherein said secondary cylinder is affixed to said rotation collar means with one end of a secondary piston rod affixed to said secondary piston and the other end of said secondary piston rod is affixed to said solar collector surface.

4. The system of claim 3 wherein said primary cylinder is affixed to said support means with one end of a primary piston rod affixed to said primary piston and the other end of said primary piston rod is affixed to said rotation collar means.

5. The system of claim 1 wherein said means for selectively adding and removing hydraulic fluid to and from said primary cylinder and said means for selectively adding and removing hydraulic fluid to and from said secondary cylinder include a hydraulic fluid accumulator, means for supplying pressurized hydraulic fluid to said accumulator, at least one primary hydraulic fluid conduit communicating with said accumulator and said primary cylinder, primary valve means in said primary hydraulic fluid conduit to control the flow of hydraulic fluid flowing into and out of said primary cylinder, at least one secondary hydraulic fluid conduit communicating with said accumulator and said secondary cylinder and secondary valve means in said secondary hydraulic fluid conduit to control the flow of hydraulic fluid flowing into and out of said secondary cylinder.

6. The system of claim 5 wherein said primary valve means and said secondary valve means limit the free flow of hydraulic fluid in said primary hydraulic fluid conduit and in said secondary hydraulic fluid conduit even when said primary valve means and said secondary valve means are full open.

7. The system of claim 6 wherein a bypass conduit bypasses at least one of said primary valve means and said secondary valve means with a bypass valve being disposed in said bypass conduit.

8. The system of claim 1 wherein said rotation axle means are journaled into spaced apart and opposing bearing means supported by said support means with at least one universal joint disposed in said axle means intermediate said spaced apart bearing means.

9. A solar collector system comprising:
   (a) a moveable solar collector surface;

(b) rotation axle means supporting said solar collector surface;
(c) support means supporting bearing means in spaced apart and opposing relationship, said bearing means being adapted to receive said rotation axle means whereby said rotation axle means is journaled into said bearing means; and
(d) at least one universal joint being disposed in said axle means intermediate said bearing means.

10. The system of claim 9 wherein said universal joint is a load-bearing universal joint adapted to support at least a portion of the weight of said moveable solar collector surface.

11. The system of claim 9 wherein said universal joint is adapted to compensate for misalignment of said bearing means whereby said rotation axle means remains free to rotate when such misalignment occurs.

* * * * *